Feb. 21, 1933.  R. E. WATTS  1,898,411
DRIVING GEAR FOR ENGINES, COMPRESSORS, PUMPS, AND THE LIKE
Filed Jan. 13, 1931  4 Sheets-Sheet 1
Fig.1.
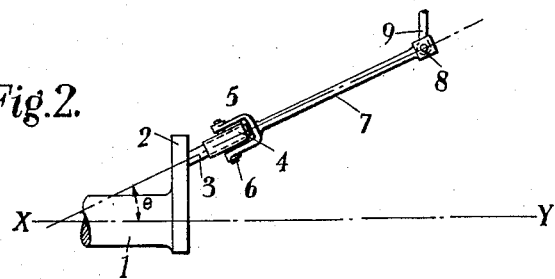
Fig.2.
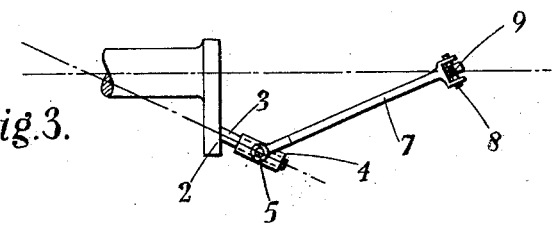
Fig.3.
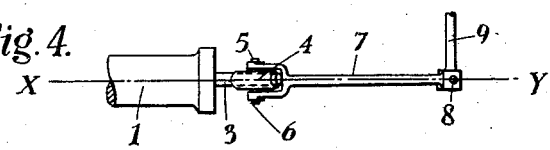
Fig.4.
Fig.7.
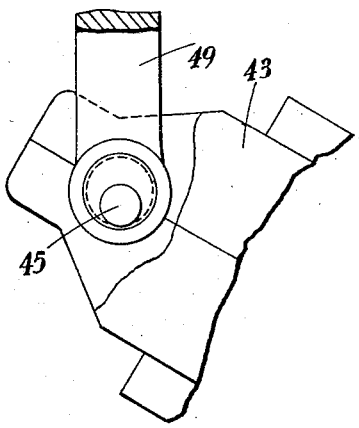
INVENTOR
R.E. WATTS
BY
ATTORNEY Feb. 21, 1933.  R. E. WATTS  1,898,411
DRIVING GEAR FOR ENGINES, COMPRESSORS, PUMPS, AND THE LIKE
Filed Jan. 13, 1931  4 Sheets-Sheet 2
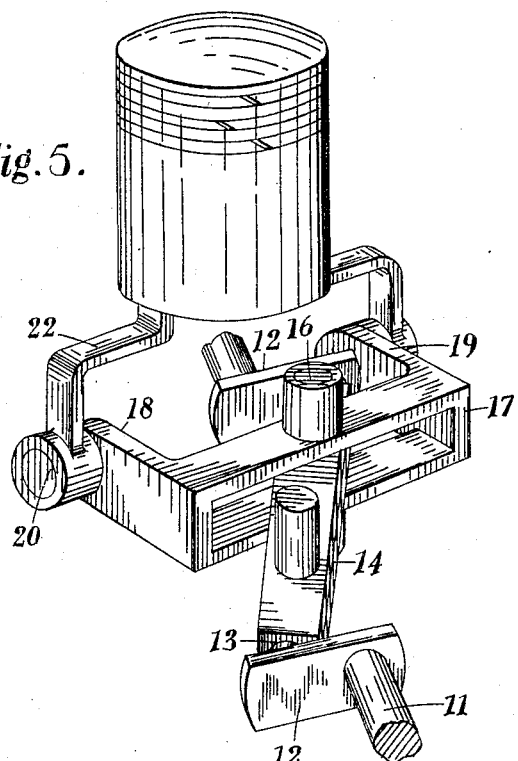
Fig. 5.
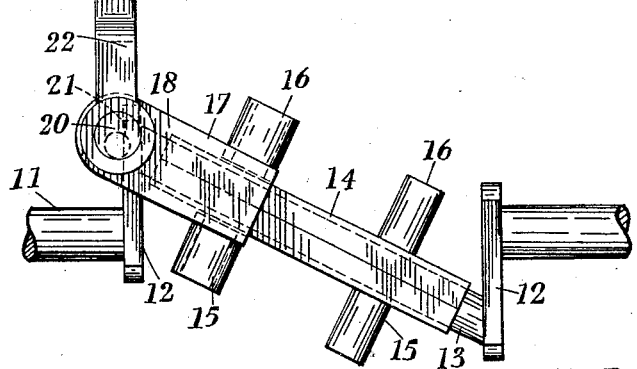
Fig. 6.
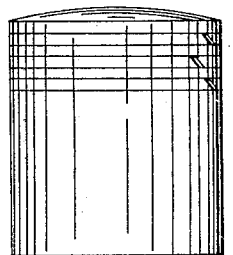
INVENTOR
R. E. WATTS
BY
ATTORNEY Feb. 21, 1933.  R. E. WATTS  1,898,411
DRIVING GEAR FOR ENGINES, COMPRESSORS, PUMPS, AND THE LIKE
Filed Jan. 13, 1931  4 Sheets-Sheet 3

INVENTOR
R.E. WATTS
BY
ATTORNEY

Feb. 21, 1933. R. E. WATTS 1,898,411
DRIVING GEAR FOR ENGINES, COMPRESSORS, PUMPS, AND THE LIKE
Filed Jan. 13, 1931 4 Sheets-Sheet 4

INVENTOR
R.E.WATTS
BY
ATTORNEY

Patented Feb. 21, 1933

1,898,411

UNITED STATES PATENT OFFICE

RICHARD EDWARD WATTS, OF STAMFORD, ENGLAND

DRIVING GEAR FOR ENGINES, COMPRESSORS, PUMPS, AND THE LIKE

Application filed January 13, 1931, Serial No. 508,508, and in Great Britain January 17, 1930.

This invention relates to means for converting reciprocating into rotary motion and vice versa.

Primarily the invention comprises a crank shaft and a link, one end of which is coupled to the crank by a universal joint and the other end of which reciprocates in a path which passes across the axis of the crank shaft in a direction substantially at right angles to it.

In carrying the invention into effect, I provide in a particular embodiment a crank shaft and a link, one end of which is coupled to the crank by means of trunnions mounted for rotation about the axis of an oblique crank pin, and the other end of which reciprocates between positions in which it is in line with the axis of said pin. Usually the trunnions are carried by a sleeve rotatable on a cylindrical oblique crank pin, but I may, if desired, provide fixed trunnions in an oblique crank pin, the ends of which are rotatable in bearings in the crank shaft webs.

In a preferred form, the effective length of the link is equal to the effective distance between the rocking axis of the link relatively to the crank pin and the point of intersection of the axis of the crank pin and its axis of rotation, said distance being taken along the axis of the crank pin.

This invention enables me to construct an engine, pump, compressor or the like of the Z-crank type, in which the axis of the cylinder is at right angles to and intersects the axis of the crank pin shaft.

The invention further comprises various arrangements and constructions embodying the elemental form of mechanism described above which will now be more particularly described.

The invention is illustrated in the accompanying drawings in which

Figures 1, 2, 3 and 4 represent in plan and elevation respectively a simple constructional form in which movement through 90° is supposed to have occurred between Figs. 1 and 2 and Figs. 3 and 4.

Figures 5 and 6 represent in perspective and side elevation respectively a development of the mechanism illustrated in Figs. 1 to 4 showing its application to a Z crank.

Figure 7 is a view of a joint.

Figure 8:
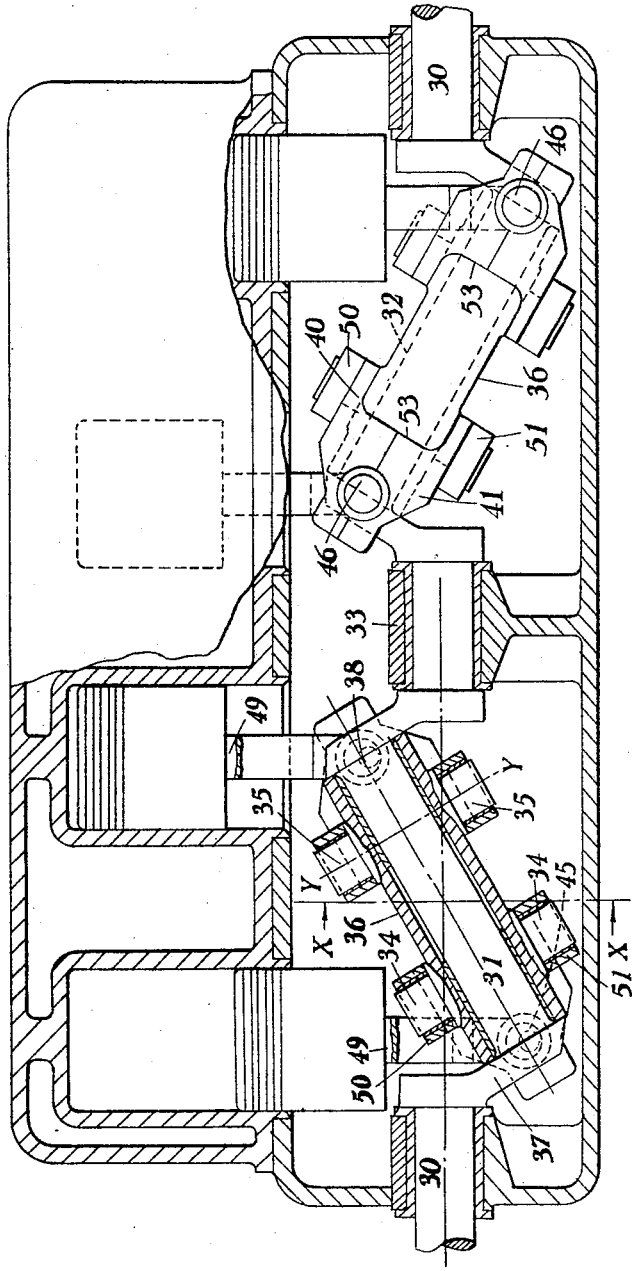
Figures 8 and 9 show in sectional plan and elevation respectively a four cylinder engine or pump including a pair of Z cranks.

Turning now to Figs. 1 to 4 of the drawings, I here illustrate a simple form of mechanism conforming to the above. The mechanism includes a shaft 1 having a web 2 carrying an oblique crank pin 3 which diverges from the axis of rotation XY so that the motion of the reciprocating parts will not foul the crank shaft. The crank pin 3 carries a sleeve 4 provided with transverse trunnions 5, 6 at right angles to the axis of the pin 3. On the trunnions is mounted one end of a lever or link 7 for pivotal movement about the axis of the trunnions, the remote end of the lever carrying a pivot pin 8, the axis of which is at right angles to that of the trunnions 5, 6; the piston rod 9 is pivotally mounted on the pin 8. In this construction, as the shaft rotates through 90° from the position illustrated in Figs. 1 and 2 to that illustrated in Figs. 3 and 4, the piston rod will be lowered until its lower end lies on the axis of rotation. It will also have received an angular movement in plan equal to the angle between the axis of the crank pin and the axis XY.

It will be understood that the crank pin 3 executes a rotary movement about its axis of rotation $x$, $y$, its path following the surface of a cone. During this movement the trunnions of the sleeve, in addition to moving generally in a circular path round the axis of the cone, will also rock laterally in elevation as indicated in Figs. 2 and 4. This rocking movement depresses or raises the remote ends of the lever 7 and thus the piston rod 9. The lever 7, however, swings from side to side of the axis X, Y, about the axis of the piston rod, and the piston will receive a rotary movement within the cylinder.

The following points are to be noted in connection with Figures 1 to 4.

1. The remote end of the link 7 carrying the pivot 8 traverses the axis of the crank shaft in a direction substantially at right angles to it.

2. The link 7 in its uppermost and lowermost positions lies generally in line with the axis of the crank pin 3.

3. The link 7 is always inclined to a plane in which the piston rod 9 reciprocates, the said plane being that to which the axis XY is perpendicular, and being at right angles to the plane of the paper of the drawings.

In moving from the position shown in Fig. 1 to that shown in Fig. 3, the sleeve will reciprocate slightly axially of the crank pin. In order to avoid this sliding movement in an actual construction, I prefer to connect the lever to the piston rod by an eccentrically-mounted pivot such as that illustrated in Fig. 7, which provides for a virtual ability for elongation of the length of the lever 7.

The mechanism of Figs. 1 to 4 is purely illustrative, being otherwise mechanically open to obvious objections; in Figs. 5 and 6 I have shown a development of this mechanism in which the invention is applied to one half of an ordinary Z crank. In these figures, the crank shaft 11 carries webs 12 supporting an oblique crank pin 13 on which is mounted the sleeve 14 rigidly supporting the trunnions 15, 16. The lever or link of Figs. 1 to 4 comprises a rocker 17 which oscillates on the trunnions 15, 16 and is provided with rearwardly extending arms 18, 19 providing the effective length of the lever or link. These arms are spaced widely apart at their remote ends so as to clear the web 12, and to them is connected by eccentrically-mounted transverse pivot pins 20, 21 extending at right angles to the trunnions 15, 16 the stirrup-shaped lower end 22 of the piston rod.

The mechanism is illustrated in Fig. 5 in the position in which the webs are horizontal and the piston rod has made a half stroke; in Fig. 6 the piston rod is at the top of its travel. During the 180° rotation of the shaft 11, the piston rod will descend until the pins 20, 21 are as far below the axis of rotation in Fig. 6 as they are there illustrated above it. During this time, the arms 18, 19 will rock in plan about the trunnions 15, 16, which will undergo a lateral displacement in space, and the pivot pins 20, 21 will rock laterally about the centre line of the rod 22. It is clear that as the shaft 11 rotates, the trunnions 15, 16 will rock in elevation from the oblique position shown in Fig. 6 to a vertical position after 90° rotation of the crank shaft, and then to a position in which they are oppositely inclined after 180°.

It will be realized that the stirrup 22 may be replaced by a single spindle extending across the arms and pivotally supporting a journal carried by the piston rod provided that the ends of the arms are raised sufficiently to enable the spindle to clear the web of the crank shaft.

Figure 9:
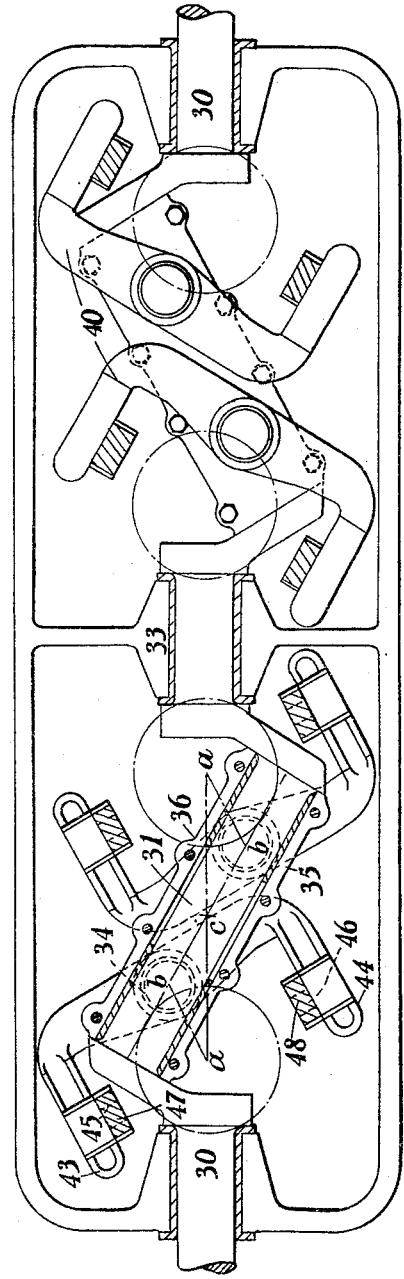

Figures 8 and 9 illustrate a constructional form of engine embodying the present invention. Fig. 8 is a half sectional elevation, and Fig. 9 a half sectional plan. The moving parts, however, in Fig. 9 are shown 90° in advance of Fig. 8.

Figure 10:
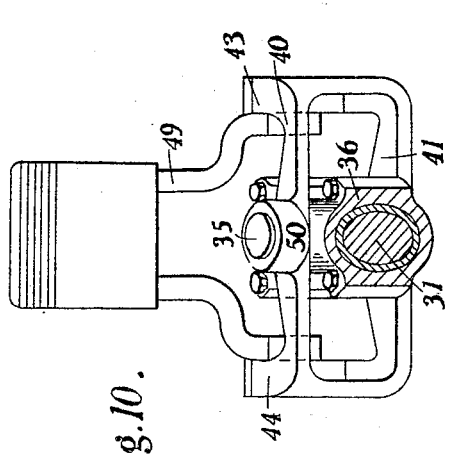
Figures 10 and 11 show a detail of Figs. 8 and 9 taken in sections on the lines XX and YY of Fig. 8.
Figure 11:
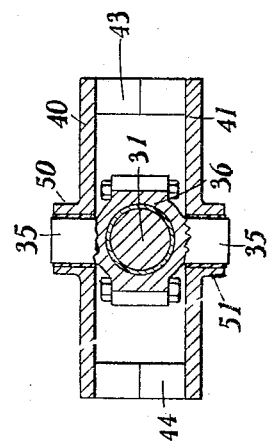

Turning now to the form illustrated, the shaft 30 is formed integrally with two Z crank portions 31, 32 inclined in opposite directions to balance end thrust and supported by a central bearing 33. The two pairs of trunnions 34, 34, 35, 35, are both formed integrally with the sleeve 36 which is prevented from endwise movement on the crank pin by the webs 37, 38. The levers or links are similar in the case of the four piston rods, an example being shown separately in Figs. 10 and 11. They comprise an upper and lower web 40, 41 having lateral extensions 43, 44, in which are journaled pins 45, 46 rotatably carried by eccentric mountings in the feet 47, 48 of a stirrup carrying the piston rods such as 49. The upper and lower webs 40, 41 are provided with bosses 50, 51 to receive the trunnions of the sleeves, the metal between the webs being cut back as illustrated at 53, about the trunnions to avoid fouling the sleeves 36. In the left hand side of Figs. 8 and 9 is shown in chain lines $a$, $b$, $b$, $c$, the effective lengths of the lever and that portion of the crank pin intercepted between the trunnions and the axis X, Y of Figs. 1 to 4.

Fig. 7 shows an enlarged view of the eccentric mounting of a pivot 45 in a stirrup 49 of a piston rod.

It will be realized more particularly from a consideration of Figs. 2 to 5 that instead of mounting the trunnions 5 or 15, 16 on a sleeve rotatable on the crank pin the trunnions might be fixed to the crank pin if the latter is allowed to rotate about its own axis by being journaled in the crank shaft webs 2 or 12.

In the form shown, assuming the diameter of a piston is 4 c. m. the theoretical length of the lever 40 is only 2 c. m. and the amount of eccentricity to provide for theoretical elongation of the levers during each half stroke of the pistons is very small. Preferably the amount actually provided exceeds the theoretical requirement to allow for possible inexactitudes in machining and/or wear.

The invention further includes the modification in which two pairs of trunnions are carried by a single sleeve, and only one lever is coupled to a piston rod by eccentric pivots, the amount of eccentricity in this case combined with slight axial travel of the sleeve being sufficient to accommodate the theoretical out-of-alignment of both couplings.

I claim:—

1. Engine, pump, compressor or the like including mechanism having an oblique crank pin, trunnions mounted for rocking movement on said pin, a lever or link articulated to said trunnions, for rocking about the axes thereof, in which the effective length of the lever or link is equal to the effective distance between the rocking axis of lever, and the point of intersection of the axis of the crank pin and its axis of rotation, said distance being taken along the axis of the crank pin.

2. Engine, pump or compressor actuated by means of a crank shaft, an oblique crank pin and a link, one end of which is coupled to the crank by means of trunnions mounted for rotation about the axis of said oblique crank pin, and the other end of which reciprocates between positions in which it is in line with the axis of said pin, in which the said other end of the link is jointed to a piston rod which is rigid with a piston through the intermediary of eccentric pivot.

3. Means for converting reciprocating into rotary motion and vice versa comprising a crank shaft and a link, one end of which is coupled to the crank by a universal joint and the other end of which reciprocates so as to pass across the axis of the crank shaft in a direction substantially at right angles to it, in which the link is coupled to an oblique crank pin and the effective length of the link is equal to the effective distance between the joint between the crank pin and the link on the one hand, and the point of intersection of the axis of the crank pin and its axis of rotation on the other.

4. Means for converting reciprocating into rotary motion and vice versa comprising a crank shaft, an oblique crank pin and a link, one end of which is coupled to the crank by means of trunnions mounted for rotation about the axis of said oblique crank pin, and the other end of which reciprocates between positions in which it is in line with the axis of said pin, in which the link is coupled to an oblique crank pin and the effective length of the link is equal to the effective distance between the joint between the crank pin and the link on the one hand, and the point of intersection of the axis of the crank pin and its axis of rotation on the other.

5. Means for converting reciprocating into rotary motion and vice versa comprising a crank shaft and a link, one end of which is coupled to the crank by a universal joint and the other end of which reciprocates so as to pass across the axis of the crank shaft in a direction substantially at right angles to it, in which means such as the eccentric mounting of its pivot is provided to allow for the virtual elongation of the length of the link during its throw.

6. Means for converting reciprocating into rotary motion and vice versa comprising a crank shaft, an oblique crank pin and a link, one end of which is coupled to the crank by means of trunnions mounted for rotation about the axis of said oblique crank pin, and the other end of which reciprocates between positions in which it is in line with the axis of said pin, in which means such as the eccentric mounting of its pivot is provided to allow for the virtual elongation of the length of the link during its throw.

7. Engine, pump, compressor or the like, having an oblique crank pin, a pair of sleeve portions mounted thereon, a pair of levers or links pivoted to said sleeve portions at right angles to the axis of said pin, and each having at its other end pivotal means to couple a reciprocating part for movement in a path at right angles to the axis of said crank pin.

In testimony whereof I affix my signature.
RICHARD EDWARD WATTS.